(12) United States Patent
Hyland et al.

(10) Patent No.: US 9,530,101 B1
(45) Date of Patent: Dec. 27, 2016

(54) METHOD FOR CALCULATING SENSOR PERFORMANCE OF A SENSOR GRID USING DYNAMIC PATH AGGREGATION

(71) Applicants: John C. Hyland, Panama City, FL (US); Cheryl M. Smith, Panama City, FL (US)

(72) Inventors: John C. Hyland, Panama City, FL (US); Cheryl M. Smith, Panama City, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 530 days.

(21) Appl. No.: 14/085,277

(22) Filed: Nov. 20, 2013

(51) Int. Cl.
G06N 7/00 (2006.01)
G06N 7/08 (2006.01)

(52) U.S. Cl.
CPC ............... *G06N 7/005* (2013.01); *G06N 7/08* (2013.01)

(58) Field of Classification Search
CPC ..... G06T 7/0012; G06T 7/0081; A61B 5/055; G06K 9/00
See application file for complete search history.

(56) References Cited

U.S. PATENT DOCUMENTS

| | | | |
|---|---|---|---|
| 2011/0080336 A1* | 4/2011 | Leyvand | A63F 13/10 345/156 |
| 2015/0269427 A1* | 9/2015 | Kim | G06K 9/00369 348/159 |
| 2015/0294143 A1* | 10/2015 | Wells | G06K 9/00369 348/159 |
| 2015/0294483 A1* | 10/2015 | Wells | G06T 7/2093 382/103 |
| 2015/0294496 A1* | 10/2015 | Medasani | H04N 7/181 348/159 |

\* cited by examiner

*Primary Examiner* — James Yang
(74) *Attorney, Agent, or Firm* — James T. Shepherd

(57) ABSTRACT

A technique is provided for determining expected maximum probability of detection of targets moving through a sensor grid to maximize performance of the sensor grid by changing the sensor grid variables. Non-spatial variables from a plurality of sensors of the sensor grid are removed to provide that sensor performance of the plurality of sensors is a function of spatial variables. A selection is made for the desired description of flow of targets such as pedestrians through the sensor grid between restricted stochastic flow and unrestricted stochastic flow. The specific technique and related equations for determining expected maximum probability of detection for each sensor depends on whether restricted stochastic flow or unrestricted stochastic flow is selected.

10 Claims, 7 Drawing Sheets

METHOD FOR CALCULATING SENSOR PERFORMANCE OF A SENSOR GRID USING DYNAMIC PATH AGGREGATION

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION (1) Field of the Invention

The present invention relates generally to threat detection systems. More specifically, the present invention relates to a method for calculating expected maximum sensor performance of a sensor grid for detecting threats when the number of possible threat pathways through the sensor grid is so large that the technique of using all possible pathways to determine the expected maximum probability of detection is impractical.

(2) Description of the Prior Art

Over the past decade, reaction to the terrorism threat has led to increased deployment of threat detection systems at airports and densely populated events as well as accelerated research and development of new threat detection systems. Potential terrorists have a myriad of weapons from which to choose such as knives, handguns, small assault weapons, explosives, dirty bombs, and the like.

In general, particular threat detection systems focus on detecting a specific weapon characteristics. For instance, a munitions or explosives detection sensor would detect trace explosive chemicals while a radiation detection system would detect radioactive material. Unfortunately, no one system will detect every possible weapon. Combining multiple detection sensors to cover a broad spectrum of weapons, however, should greatly improve the overall probability of detecting a weapon on a terrorist.

FIG. 1 illustrates this concept with a multi-layered target detection system having major components 12, 14, and 16 for scanning targets 15 such as pedestrians. Note that the depicted sensors do not represent any particular sensors. The depicted sensors preferably represent a broad range of coverage patterns, automated sensors and man-in-the loop sensors. The first layer 30 comprises long-range tripwire sensor array 12 that detects suspicious targets from among the many targets or pedestrians 15. First layer 30 designates likely threat 24 for tracking and further scrutiny by subsequent layers.

In the second layer 32, the designated likely threat 24 is tracked along threat trajectory 22. Tracking sensors 14 are part of a second layer 32 that further scans threat 24 for biometric, spectral, anomalous, and physical features indicating that threat 24 may be carrying weapons.

All suspicious targets identified by second layer 32 are then passed off to a confirmation layer 34, which either confirms or denies the presence of weapons on the target. Confirmation sensor 16 will determine a confirmed threat 20 using hidden device detection, bulk explosive detection, trace detection, and/or electronics detection. Layer 34 may comprise an operator with computer 18 that is utilized in conjunction with system operation and which receives the sensor data produced by tripwire sensor array 12, tracking sensors 14, and confirmation sensors 16.

This particular deployment scenario makes sense when layer 30 has a scan rate fast enough to scrutinize all of the candidate targets and cull them for subsequent layers with potentially slower scan rates. Selecting the specific fusion rules to combine detection information within and across layers depends on specific sensor scan rates. Culling candidate targets may not be necessary when all sensors have high scan rates.

In 2010, the Naval Surface Warfare Center Panama City Division (NSWC PCD) developed a System Performance and Layered Analysis Tool (SPLAT) that evaluates candidate terrorist threat detection systems. Given a sensor deployment pattern, SPLAT combines sensor performances, scenario data, and pedestrian flow to analytically compute expected system performance in terms of probability of detection (pd) and false alarm (pfa). The analysis divides the detection area into rectangular pixels.

FIG. 2 illustrates this pixelation using five-foot by five-foot pixels referred to herein as voxels 240. Straight line path 230 represents one possible path through detection zone 250. In this example, path 230 starts at a starting voxel in row 1, with starting column Cs. Path 230 ends at the ending voxel, which can be described as being in the last row, at ending column Ce. Because the 2010 pedestrian flow model describes all possible trajectories through the detection area as forward motion only, straight-line paths, SPLAT can enumerate all possible straight -line paths and explicitly determine the pd and pfa along each voxel in the path.

As one example of this type of analysis, shaded pixels or voxels, such as voxels 340, in FIG. 3 illustrate the voxels that the displayed straight-line path 330 of a potential threat crosses. The voxels represent regions in which detectors for threats may be found. SPLAT could be used to determine the probability of detection or likelihood of a false alarm.

Extensive experience with mine-hunting systems has demonstrated that the typical approach of modeling multiple detection opportunities along a trajectory of a target as independent Bernoulli trials tends to be over optimistic. This unrealistically inflates overall probability of detection. For instance, consider a potential threat standing still in a voxel and let a first sensor have a probability of detection for that voxel equal to 0.5. Furthermore, let the entire detection process for the first sensor take two seconds. The first sensor would then have ten detection opportunities if the threat were stationary for twenty seconds. Under the independent Bernoulli trial assumption, the overall probability of detecting a threat at least once over twenty seconds would be $1.0-(0.5)^{10}$ which equals 0.999022. As the time the target remains stationary in the voxel increases, the probability of at least one detection would asymptotically approach 1.0. However, this analysis is inherently flawed in that each detection opportunity is not independent from the others.

In general, if a detection model for a sensor were capable of including each and every variable that affected its performance, the outcome of a detection opportunity would not be random at all. Instead, it would be completely deterministic.

In practice, however, we can only capture a subset of all of the variables that affect sensor performance. Furthermore, we cannot measure this subset with absolute precision. Many variable measurements include random noise. Given an imprecise measurement subset, however, we can still measure the performance of a sensor for a random target. Repeating this process over and over is a standard methodology to determine a sensor probability of detection for a truly random target. However, the idea of a random target explicitly means that both the excluded variables and any random noise components on the variable measurements must be truly random in nature.

The analysis in the preceding example failed to capture the point that although the excluded variables were in fact random for the first detection opportunity, they were no longer random for any subsequent detection opportunity. In fact, there was likely very little change in the excluded variables from one detection opportunity to the next since the time interval was only two seconds. Whether or not the random noise on the measured variables is truly random from one detection opportunity to the next depends on the nature of the measurements and how these measurements are taken. Therefore, as a target moves through a layer presenting detection opportunities, many of the variables, both included and excluded, affecting sensor performance are highly correlated. Therefore, these detection opportunities are not independent, but rather highly correlated.

Note that for a detection system comprised of a system -of-systems, measuring individual sensor performances separately fails to capture correlations between the sensors. Properly measuring joint sensor performances requires testing all of the sensors at the same time; this ensures that the environmental test conditions and target scenarios are identical. Unfortunately, in practice, the number and range of sensor variables makes evaluating sensor performance over all possible variable mixture levels virtually impossible.

For each sensor type, SPLAT analysis employs the conservative approach of using the maximum probability of detection along the target trajectory through a detection layer as a single, discrete probability of detection opportunity for the corresponding sensor type. Although this non-linear approach makes the mathematical analysis extremely complex, this approach does provide an analytic solution without knowing joint sensor probabilities of detection over all detection opportunities. Even though it underestimates probability of detection, it does not over estimate it. It is a conservative and practical solution that accounts for correlated detection opportunities in an environment in which joint sensor performances are unknown.

Because the 2010 SPLAT pedestrian flow model describes all possible trips through the detection area as forward motion only, straight-line paths, SPLAT can enumerate all possible trips and explicitly determine the maximum pd along each trip.

However, instead of a straight-line path, in a more desirable stochastic flow model, pedestrian paths are described as a series of cell-to-cell steps through the detection zone as illustrated by the piece-wise linear path example of FIG. 4. Unfortunately, this stochastic flow modeling has created a combinatorial explosion. There are now too many paths to explicitly enumerate so SPLAT can no longer determine the true maximum pd along each and every path. Addressing this problem, and discussing the above figures and other figures in more detail hereinafter, the present invention provides for a unique expected maximum probability of detection technique, which approximates results obtained by enumerating all possible paths through a detection zone.

SUMMARY OF THE INVENTION

Accordingly, it is an object of the present invention to provide an improved methodology to analytically calculate the expected maximum probability of detection, or pd, for an array of sensors deployed to detect a moving target.

Another object of the present invention is to provide a technique to estimate joint sensor performance.

Another possible object of the invention is to provide a technique to evaluate possible pathways through a monitored detection zone when the total number of possible pathways is too large to practically enumerate and separately evaluate.

In accordance with the disclosure, the present invention provides a method for calculating an expected maximum probability of detection of targets for a sensor grid within a detection zone. It may comprise steps such as partitioning the detection zone into a plurality of discrete voxels that form a discrete voxel detection zone grid comprising rows and columns wherein each discrete voxel comprises a discrete three-dimensional space, removing non-spatial variables from a plurality of sensors of the sensor grid to provide that sensor performance of the plurality of sensors are functions of spatial variables, and mapping the sensor performance of the plurality of sensors into coordinates consistent with the discrete voxel detection zone grid.

Other steps may comprise selecting a discrete target flow model to represent target movement within the discrete voxel detection zone grid wherein the discrete target flow model comprises either a restricted stochastic movement model or an unrestricted stochastic movement model. The restricted stochastic movement model requires forward movement of the targets from row to subsequent row from an entry point to the sensor grid on a first row toward an exit point from the sensor grid on a last row. The unrestricted stochastic movement model allows forward and reverse movement of the targets between rows from the entry point to the exit point.

Other steps may comprise determining the expected maximum probability of detection of the targets for the sensor grid within the detection zone.

The voxel size can be selected to be sufficiently large to encompass a single target and sufficiently small that the sensor performance is approximately the same across adjacent voxels. The plurality of discrete vowels may comprise a uniform size and shape.

Selection of the restricted stochastic model comprises utilizing an ExPdMax(s) technique adapted for the restricted stochastic model to reduce a number of required calculations from order $C^R$ to order $RC^2$. ExPdMax(s) represents an expected maximum probability of detection for each sensor, s represents each sensor, C represents columns, and R represents the rows.

For the restricted stochastic flaw model, the expected maximum probability for detection for path segments from row 1 to row 3, given Cr3, is as follows:

$$\text{ExpectedMaxPathSegmentPd}(R3, Cr3 | s, Cs, Ce) = \\ \Sigma \text{MaxPathSegmentPd}(R3, Cr3 | Cr2, s) * P\text{trip}(R2, \\ Cr2 | Cr3, Cs, Ce) \; Cr2=1, \ldots C$$

where

ExpectedMaxPathSegmentPd(R3,Cr3|s,Cs,Ce) is the ExPdMax(s) for the target movement for segments of paths from rows 1 to row 3, R3 represents row three, Cr3 represents the column of a target in row 3, Cr2 represents the column of the target in row 2, Cs represents a starting column, Ce represents an ending column, MaxPathSegmentPd(R3,Cr3|Cr2,s) is the maximum pd for sensor s over all voxels that intersect the straight lines from (R1,Cs) to (R2,Cr2) and from (R2,Cr2) to (R3,Cr3), and PTrip(Rk,CM|Cn,Cs,Ce) is the probability that a target known to be in column Cn in row Rk+1 traveled from column Cm in row Rk given the overall path starting and ending points, where n, m, and k are column and row numbers, respectively.

The expected maximum probability for detection for path segments from rows greater than or equal to row four, is as follows:

$$ExpectedMaxPathSegmentPd(Rq,Crq|s,Cs,Ce) =$$
$$\Sigma ExpMaxPathSegmentPd(Rq,Crq|Crq-1,s) *$$
$$Ptrip(Rq-1,Crq-1|Crq,Cs,Ce) \; Crq31 \; 1=1,\ldots C$$

where
ExpectedMaxPathSegmentPd(Rq,Crq|s,Cs,Ce) is ExPdMax(s) for the target movement for segments of paths from row four to a final row starting at Cs,
ExpMaxPathSegmentPd (Rq,Crq|Crq-1,s) is recursively calculated as the maximum of ExpectedMaxPathSegmentPd(Rq-1,Crq-1|s,Cs,Ce) and the maximum pd for sensor s over all voxels that intersect the straight line between (Rq-1,Crq-1) and (Rq,Crq),
Rq is for rows greater than or equal to row four, and
Crq represents the column of the target in Rq.

Selection of unrestricted stochastic model comprises utilizing an ExPdMax(s) technique adapted for the unrestricted stochastic model to account for all possible unrestricted stochastic paths through the detection zone where:
ExPdMax(s) represents the expected maximum probability of detection for each sensor, and s represents each sensor.

For the unrestricted stochastic model, the expected maximum probability for detection for path segments from step 1 to step 3, given Cr3, is as follows:

$$ExpectedMaxPathSegmentPd((R3,C3)|s,Cs,Ce) =$$
$$\Sigma MaxPathSegmentPd\big((R2,C2),(R3,C3)|s\big) *$$
$$Ptrip((R2,Cr2)|(R3,C3),Cs,Ce)$$

where:
ExpectedMaxPathSegmentPd(R3,Cr3|s,Cs,Ce) is the ExPdMax(s) for the target movement for segments of paths from step 1 to step 3,
R3 represents row at time three,
Cr3 represents the column of the target at time 3,
Cs represents a starting column,
Ce represents an ending column,
(R2,C2)=all voxels adjacent (R3,C3), and
PTrip((R2,C2)|(R3,C3),Cs,Ce) is the probability that the target in row R3, column C3 at t=3 traveled from row R2, column C2 given an overall path starting and ending point.

For the unrestricted stochastic model, the expected maximum probability for detection for path segments from time greater than or equal to time four, is as follows:

$$ExpectedMaxPathSegmentPd((Rt,Ct)|s,Cs,Ce) =$$
$$\Sigma ExpMaxPathSegmentPd_t\big((Rt,Ct)(Rt-1,Ct-1)|s\big) * Ptrip((Rt-1,Ct-1)|(Rt,Ct),Cs,Ce)$$

where
ExpectedMaxPathSegmentPd((Rt,Ct)|s,Cs,Ce) is the ExPdMax(s) for the target movement for segments of paths beginning at Cs and ending at Ce from time four to a final row,
ExpMaxPathSegmentPd( (Rt,Ct),(Rt-1,Ct-1) is calculated recursively as the maximum of ExpectedMaxPathSegmentPd((Rt-1,Ct-1)|s,Cs,Ce and the pd for s at (Rt,Ct),
Rt is for rows with a general t≥4,
Ct is for corresponding columns of Rt, and
(Rt-1,Ct-1)=all voxels adjacent. (Rt,Ct).

For both flow models, the expected maximum probability of detection of the targets for the sensor grid within the detection zone is determined by fusing ExPdMax(s) for each sensor s.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE INVENTION

Figure 1:
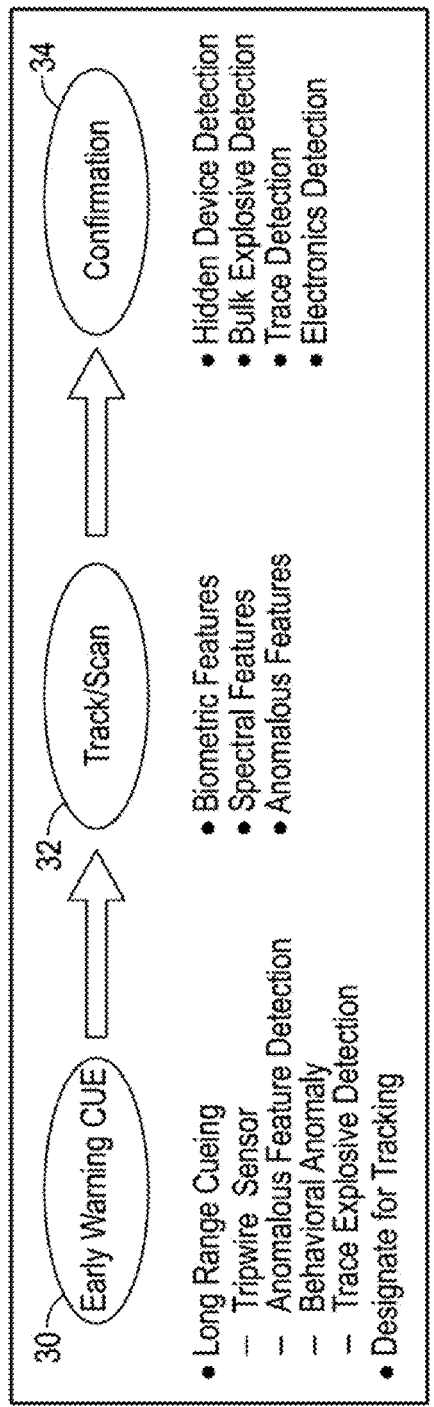
FIG. 1. is a diagram depicting a multi-layered target detection system in accord with one possible embodiment of the invention.
Figure 1:
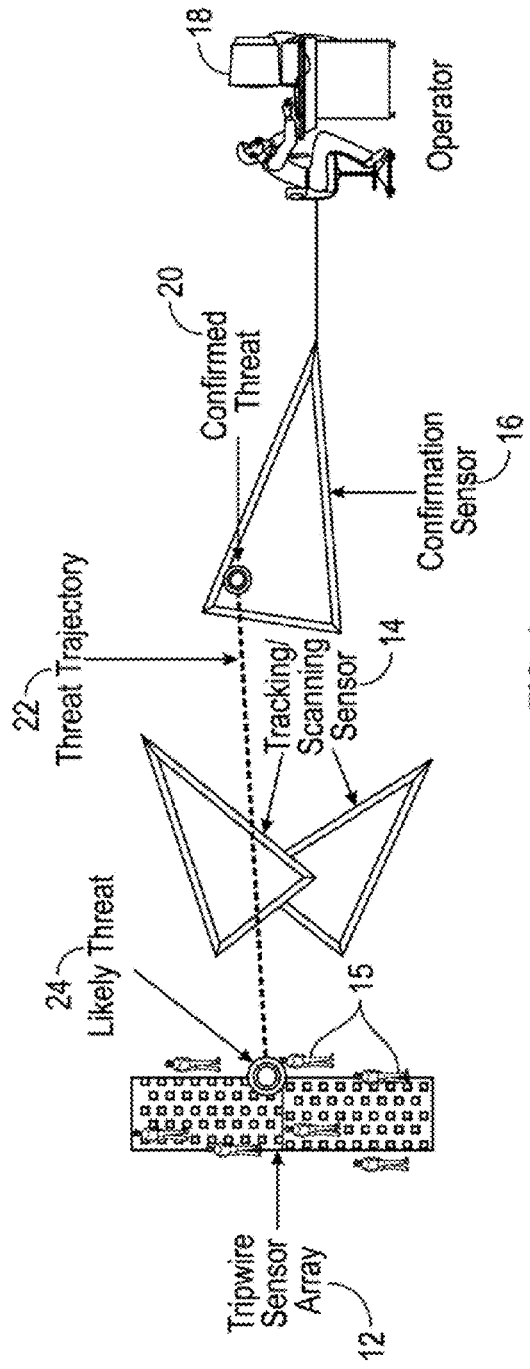

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

In general, this invention evaluates a type of nonlinear cost function over all possible event spaces when the number of event spaces is too large to explicitly enumerate. In the invention description, the inventors use maximum probability of detection as the cost function and pedestrian path as the event space. There remain a number of other possible nonlinear cost function examples in which this description is pertinent. For example, instead of maximum probability of detection, one may be interested in minimum detection probability for a detection zone as will be known as variations to those of skill in the art who have read the present specification and claims.

The present invention provides a computerized method that can be used to design an optimized physical sensor system. The system performance can be optimized using different sensor placements, different sensor grid configurations, and the other variables discussed herein based on the computerized system evaluation. As non-limiting examples, the detection system can be modified as a result of the computerized evaluation by changing the number, placement, and/or organization of the various sensors, target inlets/outlets, target flow paths, and the like. As further non-limiting examples, the system could be optimized by changing tripwire sensor array 12, tracking scanning sensors 14, confirmation sensors 16, and/or other changes. In this way, system performance can be modified and optimized without having to build and test different systems. While computer 18 could be utilized for purposes of system evaluation discussed herein and/or monitoring and/or operation of the system and/or system optimization, it will be understood that other computers may be utilized and/or interconnected with computer networks for this purpose. The computer will be configured to have selection options for selecting computerized target flow models, collecting sensor data and the like as described herein. Accordingly, the present invention provides methods for optimizing the sensor grid and/or other features of the system in ways discussed above and/or by modifying other system variables, which are discussed in some detail hereinafter.

In the maritime shipping industry, one may wish to calculate the maximum probability for falling victim to piracy. The many possible trajectories for pirate ships would be an event space too large to explicitly enumerate. Therefore, alternatives to the invention include any application of evaluating a nonlinear cost function over an event space that is too large to explicitly enumerate.

The examples and mathematical description of the invention use the convention that pedestrians enter at the bottom of the detection zone and exit at the top of the detection zone. This convention makes the recursive nature of the calculations easier to follow. However, without loss of generality, the invention is applicable to pedestrian motion in any direction; changing pedestrian direction can easily be accomplished by the use of a rotation matrix. Additionally, without loss of generality, the entry and exit points to the detection zone do not have to be on opposite sides of the detection zone; as described, the only restriction is that for each entry point, at least one line must be able to be drawn to at least one exit point. Likewise, for each exit point, at least one line must be able to be drawn to at least one entry point.

Furthermore, the complete mathematical formulation can be rewritten to change the conditioning event from the starting column Cs and the ending Column Ce to only the starting point. This reformulation permits entry and exit points to occur at any point on the detection zone boundary. This reformulation requires describing all pedestrian motion using a Markov transition model in which each pedestrian exits the area with probability one. For the unrestricted stochastic model, the entry and exit points can also be anywhere in the detection zone.

The expected maximum probability of detection method has two versions: a restricted stochastic motion version and an unrestricted stochastic motion version. The unrestricted stochastic motion version allows pedestrian movement in any direction, i.e., forward, backwards or sideways. The restricted stochastic motion version allows only forward pedestrian movement.

The present unique method calculates expected maximum sensor performance of a sensor grid by using dynamic path aggregation. Calculating expected maximum probability of detection of a sensor grid using dynamic path aggregation can be described to occur in four steps.

Figure 5:
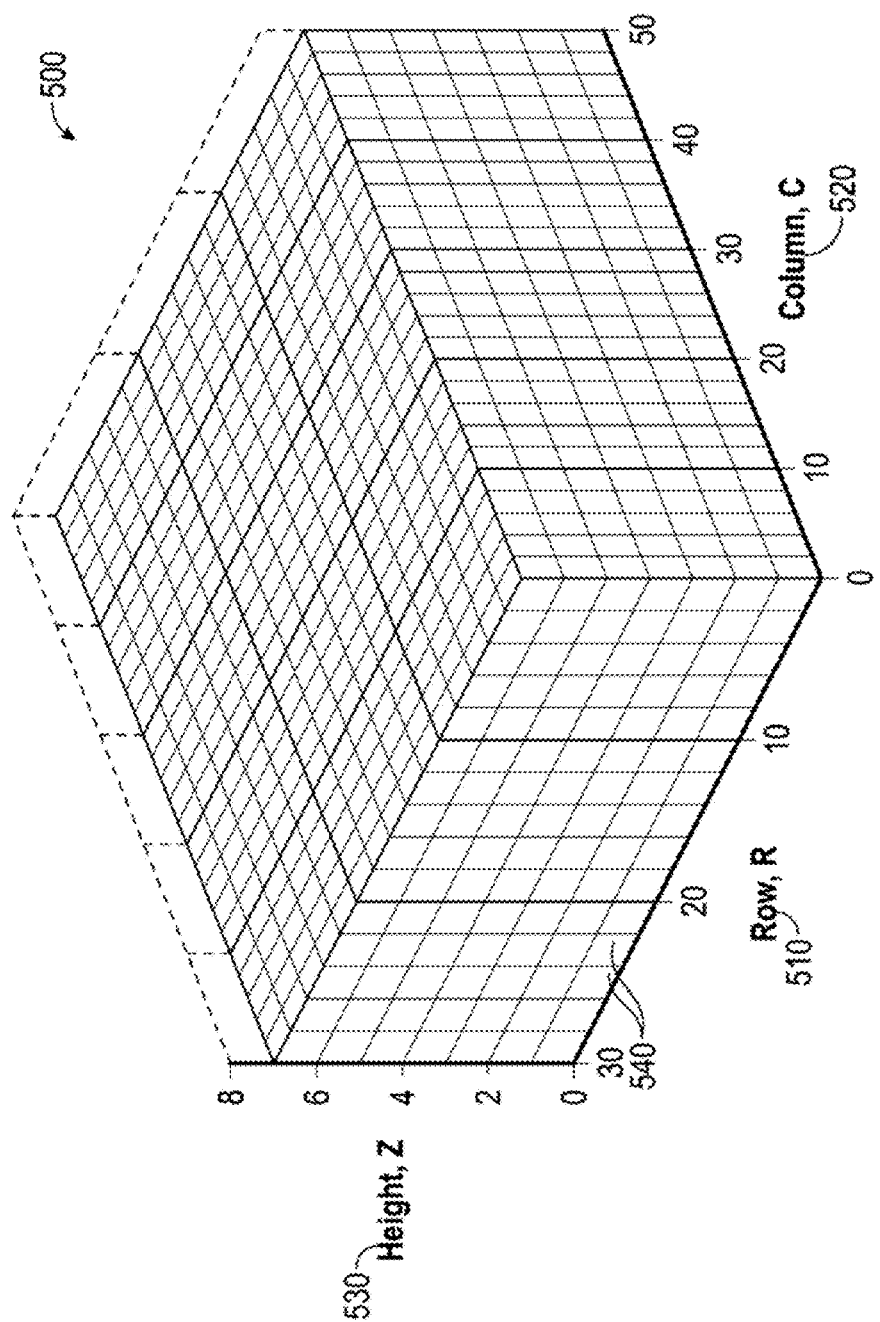
FIG. 5 is a diagram depicting another discrete voxel detection zone grid in accord with one possible embodiment of the present invention.

First, the monitored detection zone and analysis space is partitioned into discrete voxels thereby creating a discrete voxel detection zone grid (DVDZG). FIG. 5 shows discrete voxel detection zone grid 500 in accord with one embodiment of the present invention. DVDZG 500 has dimensions R×C×Z, all of which are measured in number of discrete cells. DVDZG 500, has voxels 540 with a size, of 5-feet by 5-feet by 1-foot, representing Row 510, Column 520, and Height 530 respectively. Voxels 540 are preferably uniform in size. Voxels 540 may be selected to be large enough to encompass typically only a single target and be small enough so that sensor detection between any two adjacent voxels is approximately equal.

Second, sensor performances are typically functions of both spatial and nonspatial variables. The marginal sensor performances are calculated to remove all non-spatial variables from the sensor performances. The remaining sensor performances, which are now only functions of the spatial variables, then undergo a coordinate transformation to map them into discrete coordinates consistent with the DVDZG.

Third, a discrete pedestrian flow model is chosen to represent pedestrian movement. There are currently two motion model choices available when calculating the expected maximum sensor performance: Restricted Stochastic flow and Unrestricted Stochastic flow. Note that the invention description does include detailed discussions on a third motion model, Restricted Linear flow. However, this type of motion is a subset of the Restricted Stochastic flow. The Restricted Linear motion model does not require the new dynamic path aggregation methodology and is included in the description to illuminate the novelty of dynamic path aggregation.

Figure 2:
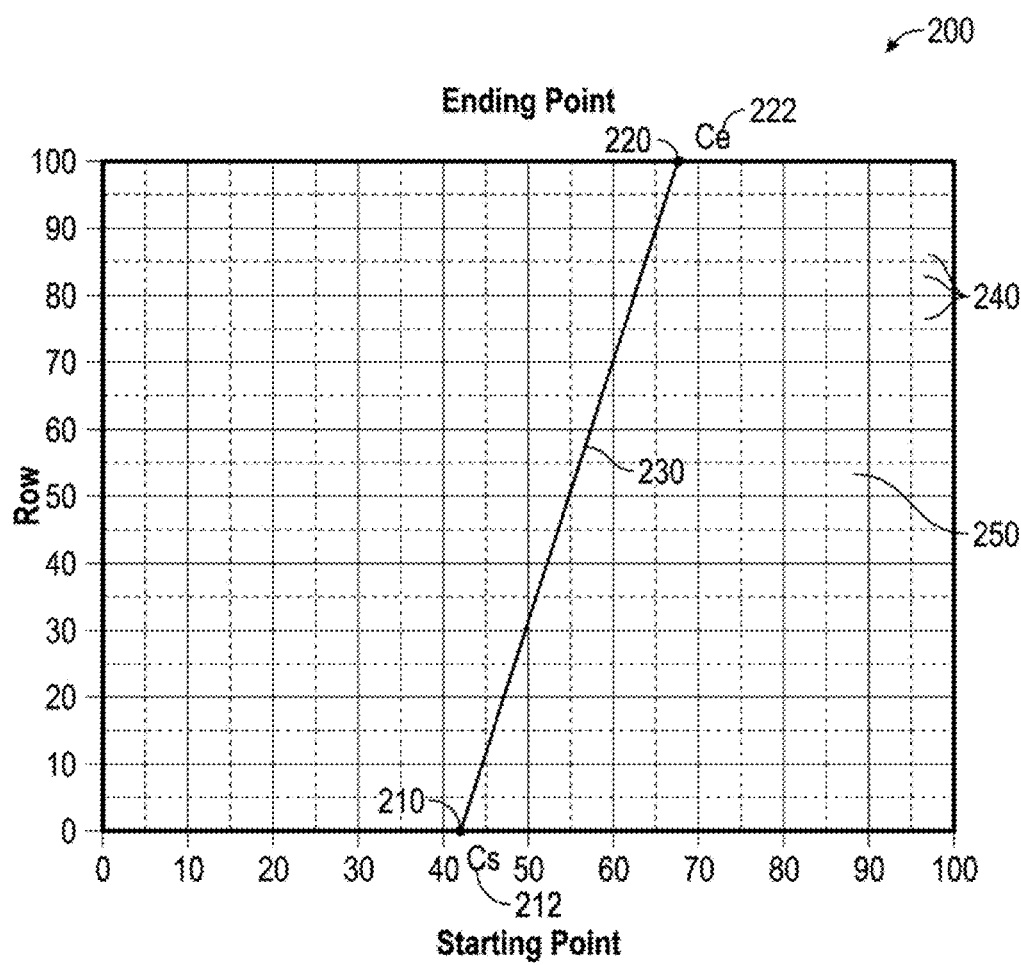
FIG. 2 is a diagram showing a straight-line path through a pixelated detection area model in accord with one possible embodiment of the invention.
Figure 3:
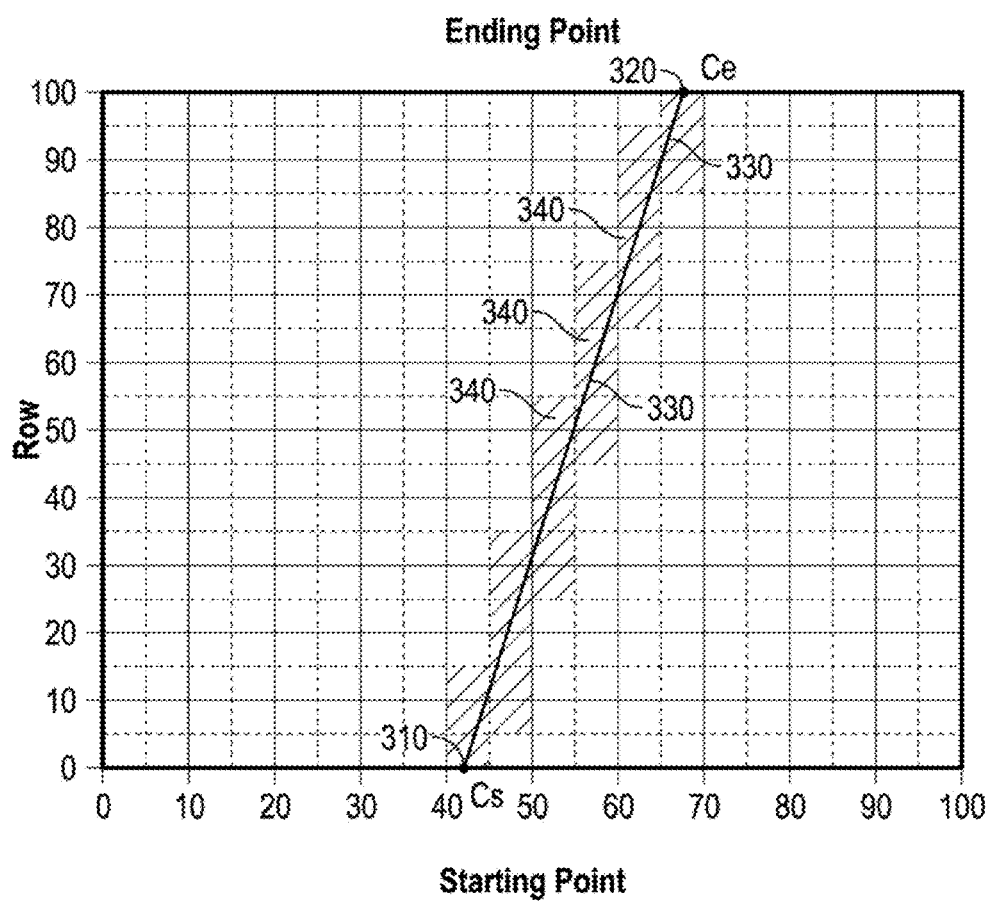
FIG. 3 is a diagram showing a straight line path intersecting with voxels in accord with one possible embodiment of the invention.

In the Restricted Linear flow model depicted in FIG. 2, straight-line path 230 forms from the voxel in row 1 with starting column Cs, as indicated at 212, which voxel also includes entry point 210. Straight-line path 230 ends at column Ce, as indicated at 222 in the last row, which also includes exit point 220. Hence, the pair (Cs, Ce) describes path 230 when it is assumed that the beginning and ending rows are predetermined. In the Restricted Linear flow model, pedestrians are only permitted to move forward along a straight line through detection zone 250, from row 1, column Cs, before ending at row R, column Ce. Therefore, this model can be generalized as a straight line formed from a cell that starts somewhere at starting point 210 and ends at ending point 220. Based on these variables, there are $C^2$ (the number of columns squared) possible restricted linear paths through DVDZG 200. All possible pathways in this flow model are subsets of those contained in the restricted stochastic flow model.

Figure 6:
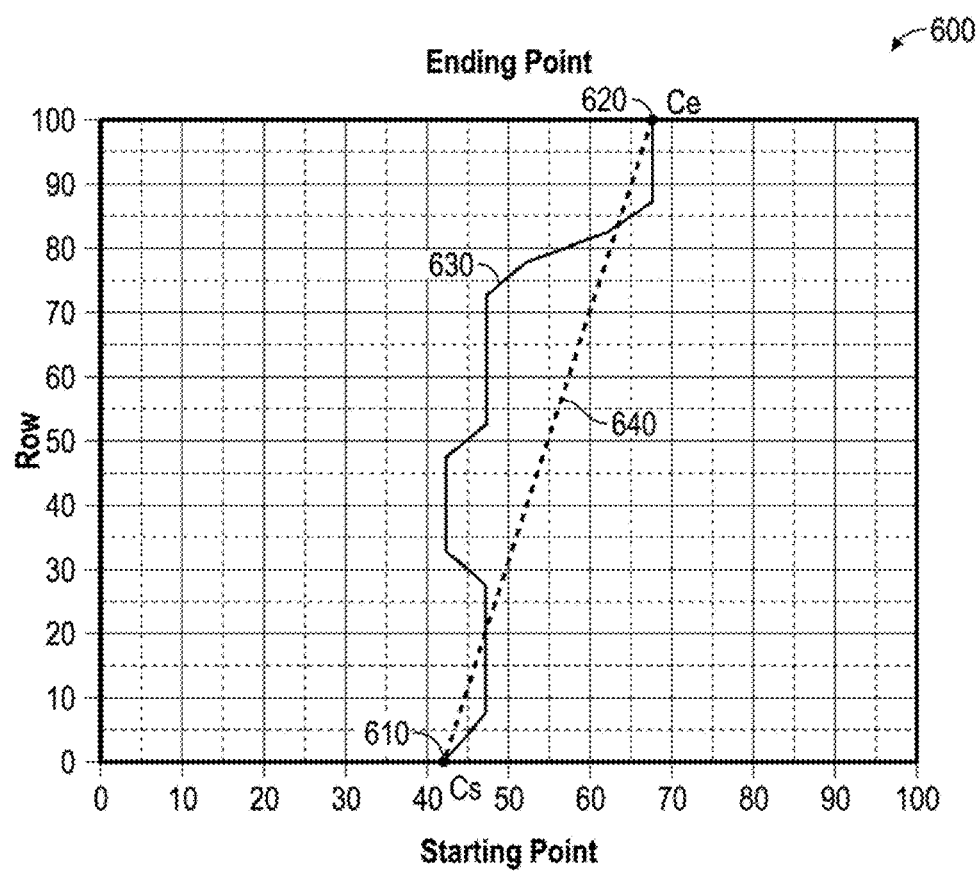
FIG. 6 is a diagram depicting a voxel detection zone with a plurality of voxels in the form of cuboids in accord with one possible embodiment of the present invention.

FIG. 6 illustrates the Restricted Stochastic flow path through DVDZG 600. The dashed line in the figure is mean path 640 and the solid path is unique pathway 630 that follows a Brownian Bridge stochastic motion model. In this model, straight line 640 formed by the pair (Cs, Ce) represents a mean path. Although a pedestrian target following stochastic path (Cs, Ce) must enter and exit at the specific points 610 and 620, once the target enters the area at point row 1, column Cs, he may move to any voxel in the next row provided the linear path (Cs, Ce) is his mean path and his variations follow a Brownian Bridge motion model. Only forward motion is permitted under this path flow model. All possible pathways in this flow model are subsets of those pathways contained in the Unrestricted Stochastic path flow model. There are $C^2$ possible mean paths and there are $C^R$ possible unique paths.

Under the Unrestricted Stochastic flow model, the point Cs specifies a pedestrian starting point. There are C possible starting points in this model and pedestrians are only permitted to enter DVDZG in row 1 and to exit the DVDZC in row R. However, a pedestrian is permitted to move from a current voxel to any of the eight adjacent voxels or to remain in the current voxel. Pedestrian motion is mathematically described by a Markov Transition Matrix that specifies the probability of transitioning from the current position and heading to a new position. In practice, all pedestrian movements are updated using a common clock cycle. If time is unrestricted, this model describes an infinite number of possible paths. However, when time is restricted to N discrete time steps, the number of possible paths is of order $R*C*9^N$.

Finally, the fourth and last step is to calculate expected maximum probability of detection for each sensor and fuse the individual sensor results using the desired fusion rule. The calculations are different for each selected path flow model as described hereinafter.

Example 1: ExPdMax(s) (expected maximum probability of detection for each sensor s) for Restricted Linear flow path.

The expected maximum probability of detection calculation for Restricted Linear path flow creates $C^2$ total linear paths, path (Cs, Ce), that start in row 1, column Cs and end in row R, column Ce. Calculating the maximum probability of detection for each sensor s along a given path is relatively straightforward. Multiple physical sensors of the same type are treated as a single sensor s.

Let V(Cs, Ce) be the set of voxels that path (Cs, Ce) intersects and let pd(j,k|s) equal the probability of detection (pd) in voxel (j,k) by sensor s. The maximum probability of detection for sensor s along a path then equals:

MaxPathPd(*Cs,Ce*|*s*)=Max{*pd(j,k|s)*}, voxels(*j,k*)∈*V*
    (*Cs|Ce*) voxels(*j,k*)

If we define ƒ(path (Cs, Ce)) as the probability density function (pdf) that describes the distribution of paths, then the overall expected maximum probability of detection for sensor s weighted over all paths is:

ExPdMax(*s*)=ΣMaxPathPd(*Cs,Ce*|*s*) * ƒ(path(*Cs,*
    *Ce*)) Path(*Cs,Ce*) *Cs*=1, . . . ,*C*; *Ce*=1, . . . ,*C*

Figure 7:
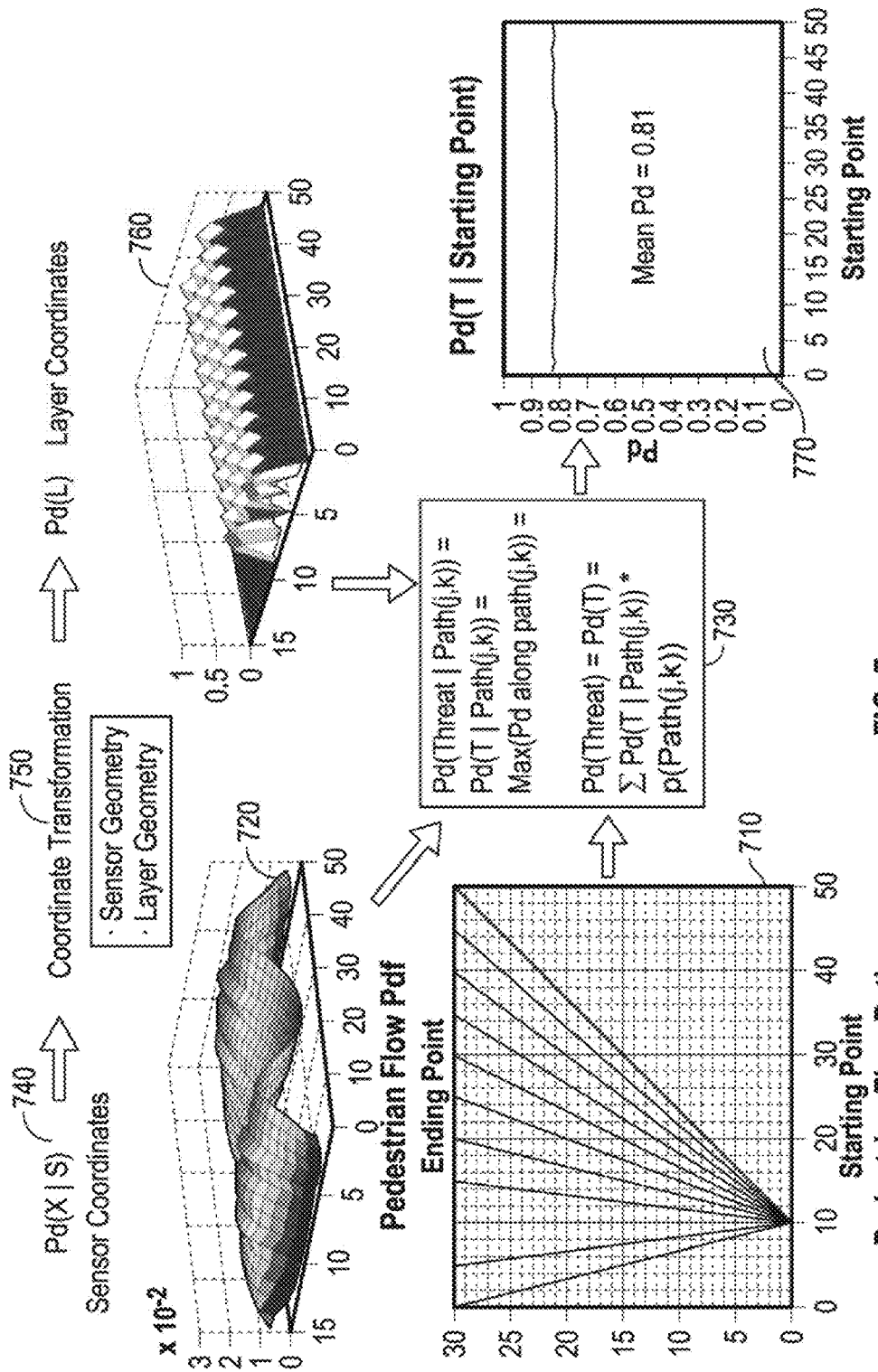
FIG. 7 is a flowchart depicting a method of enumerating paths and calculating overall performance in accord with one possible embodiment of the present invention.

In accord with the present invention, FIG. 7 more generally illustrates how the individual PathPd's, which could include different paths as illustrated at 710, with the distribution of pedestrian flow illustrated at 720. While multiple straight paths are shown in connection with the Restricted Linear flow model, the present invention is not limited to straight paths, as discussed above. The paths are weighted to yield PdMax(s), as indicated at 730. As indicated at 740, the sensor performances, which are now only functions of the spatial variables, undergo a coordinate transformation as indicated at 750 to map them into discrete coordinates consistent with the DVDZG, as indicated at 760. Overall system performance PdMaxFused as indicated at 770, is now obtained by fusing the sensor PdMax(s)'s using a selected fusion rule. In the example of FIG. 7, (j,k) refers more generally to the rows and columns rather than specifically to starting and ending columns (Cs, Ce).

Example 2: ExPdMax(s) (expected maximum probability of detection for each sensor s) for Restricted Stochastic flow path.

Enumerating all possible restricted stochastic paths through the detection zone is not computationally feasible because an R×C detection area produces $C^R$ possible paths. The present method provides a unique technique to calculate the expected maximum pd for each sensor s along each stochastic path (ExPdMax(s)), assuming particular starting/ending columns and rows, which may the be described as ExpectedMaxPathPd(Cs,Ce|s). This yields the expected maximum system performance calculation for the restricted stochastic model.

Consider the R×C detection area as previously described. And assume that we have the path pdf ƒ(path(Cs,Ce)) and that the starting and ending point pairs are a partitioning event. It we could practically enumerate all paths, then we could describe a path by listing the specific columns the pedestrian moves to as he progresses from row to row. Hence, {Cs, Cr2, Cr3, Crj, . . . Ce} uniquely and completely defines a path given the starting and ending points. Here Crj is the specific column along the path when the pedestrian enters row rj.

First, the concept of V(Cs, Ce) from the expected maximum probability of detection calculation for Restricted Linear path flow is adopted. Let W(Cm, Cn, Rk) be the set of voxels that path segment Pathsegment (Cm, Cn, Rk) intersects when a pedestrian moves from row Rk, column Cm, to row Rk+1, column Cn. For example, a stochastic path starts in row 1 and the expected maximum pd develops as discussed below for movement of the target or pedestrian.

Figure 4:
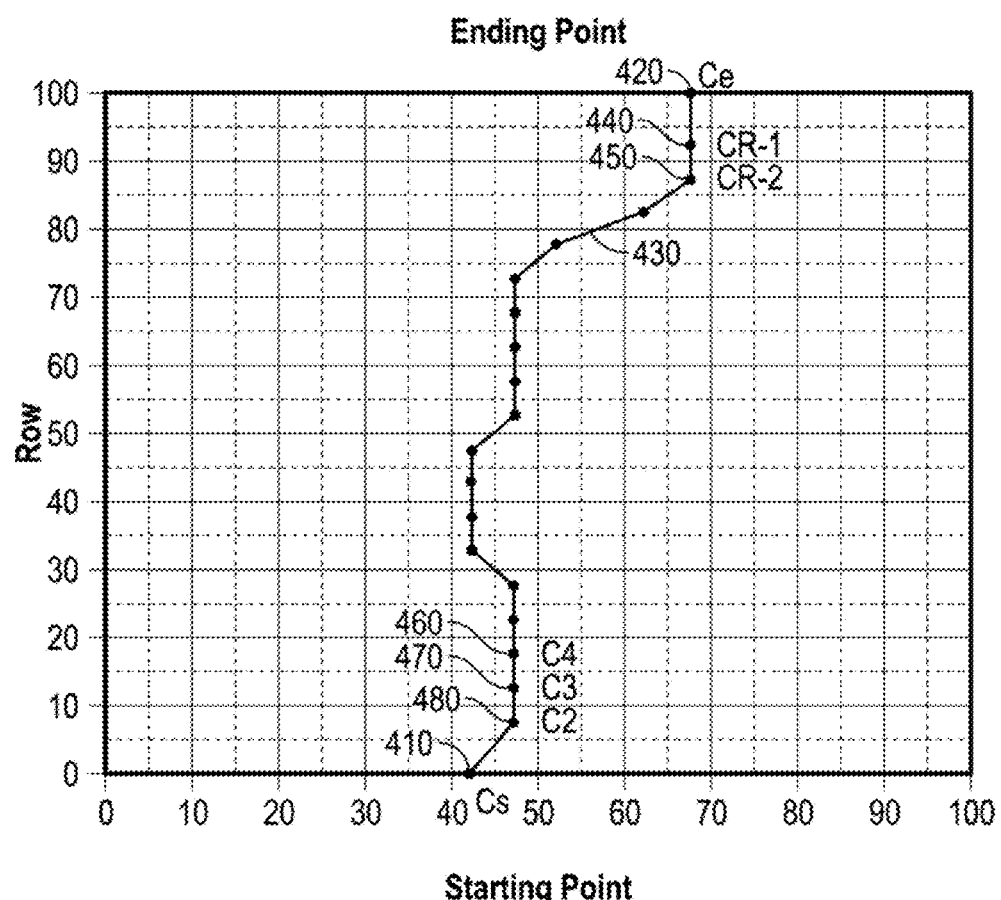
FIG. 4 is a diagram showing a piece-wise linear path model in accord with one possible embodiment of the invention.

Row 1: Since ƒ(path(Cs,Ce)) is our partitioning event we know the current column in row 1 is Cs, which for example may start at starting point 410 in FIG. 4.

Row 2: Likewise, once we pick our row 2 column, Cr2, conditioned on ƒ(path(Cs,Ce)) we know our row 2 column and we can determine W(Cs, Cr2, R1). From this we can determine the maximum pd for sensor s along the path segment PathSegment (Cs, Cr2, R1):

MaxPathSegmentPd(*R2,Cr2*|*Cs,s*)=Max{*pd(j,k|s)*}
    voxels(*j,k*)∈*W*(*Cs,Cr2,R*1)

Row 3: From the third row on, the calculations become much more complex. Once we pick a third row column we are given that a pedestrian is in row 3, column Cr3 and the starting and ending points of the mean path are known. We cannot enumerate all possible paths. Using this formulation, then, we do not know from which column in row 2 the pedestrian came. Now, define PTrip(Rk,Cm|Cn,Cs,Ce) as the probability that a pedestrian known to be in column Cn in row Rk+1 traveled from column Cm in row Rk given the overall path starting and ending points. Using a Brownian bridge pedestrian flow model, this probability is calculated. Now we calculate the expected maximum probability of detection for the columns in row 3 by conditioning on the row 2 column values, determining the conditional expected maximums along the path segments, and weighting the conditional expected maximum pds by the PTrip(Rk,Cm|Cn,Cs,Ce) values. Note that we also check if the current row 2 column MaxPathSegmentPd values are the maximum pd values. This yields:

MaxPathSegmentPd(*R3,Cr3*|*Cr2,s*)=
    Max{MaxPathSegmentPd(*R2,Cr2Cs,s*),Max{*pd*
    (*j,k|s*)}voxels(*j,k*)∈*W*(*Cr2,Cr3,R*2)

The expected maximum pd for path segments from row 1 to row 3, given Cr3, is as follows:

ExpectedMaxPathSegmentPd(*R3,Cr3*|*s,Cs,Ce*) =
    ΣMaxPathSegmentPd(*R3,Cr3*|*Cr2,s*) * *P*trip(*R*2,
    *Cr*2|*Cr*3,*Cs,Ce*) *Cr*2=1, . . . *C*

All subsequent rows use a similar recursion. At each row the expected maximum up to that point is calculated and used to estimate the maximum at the next level. This recursive calculation results in some smearing of the actual maximum probability of detection. This smearing is minimized by partitioning the space into homogeneous families of paths. Here we have used shared starting and ending points. For a general row Rq≥4, we get the conditional expected maximum at Crq in row Rq given the Rq-1 position, Crq-1:

$$\text{ExpectedMaxPathSegmentPd}(Rq,Crq|Crq\text{-}1,s) = \text{Max}$$
$$[\text{ExpectedMaxPathSegmentPd}(Rq\text{-}1,Crq\text{-}1|s,Cs,$$
$$Ce), \text{Max}\{pd(j,k|s)\}]\text{voxels}(j,k)_\epsilon W(Crq\text{-}1,Crq,$$
$$Rq\text{-}1)$$

$$\text{ExpectedMaxPathSegmentPd}(Rq,Crq|s,Cs,Ce)=$$
$$\Sigma \text{ExpectedMaxPathSegmentPd}(Rq,Crq|Crq1,s) *$$
$$P\text{trip}(Rq\text{-}1,Crq\text{-}1|Crq,Cs,Ce) \; Crq\text{-}1=1,\ldots C$$

Note that we are only concerned with the expected maximum probability of detection when a pedestrian exits the monitored detection zone. Therefore, aggregating ExpectedMaxPathSegmentPd(R,Ce|s,Cs,Ce) over all starting and ending point pairs yields the overall expected maximum pd, for each sensor, ExPdMax(s).

Overall system performance ExPdMaxFused is now obtained by fusing the sensor ExPdMax(s)'s using the selected fusion rule. Compared to enumerating stochastic paths, the ExPdMax technique reduces the number of required calculations from order $C^R$ to order $RC^2$. Hence, performance analyses for large areas that use stochastic pedestrian flow models are now possible. However, because the ExPdMax calculation uses the Maximum function, it is highly nonlinear and requires significantly more computational effort than a linear approach.

Example 3: ExPdMax(s) (expected maximum probability of detection for each sensor s) is given for an Unrestricted Stochastic flow path.

Under this model, the point Cs specifies a pedestrian's starting point; ending point is not specified. There are C possible starting points. Pedestrians are only permitted to enter the DVDZG in row 1 and to exit the DVDZC in row R. However, a pedestrian is permitted to move from its current voxel to any of its eight adjacent voxels or to remain in its current voxel provided its motion is mathematically described by a Markov Transition Matrix. In practice, all pedestrian movements are updated using a common clock cycle. If time is unrestricted, this model describes an infinite number of possible paths. However, when time is restricted to N discrete time steps, the number of possible paths is of order $C*9^N$.

The inventors have shown that enumerating all possible restricted stochastic paths through the detection zone is not computationally feasible because an R×C detection area produces $C^R$ possible paths. And for the Unrestricted Stochastic case, the number of possible paths are of the order $C*9^N$. Even with the addition of time T, however, the expected maximum pd technique can be used to calculate the expected system performance while still accounting for all possible unrestricted stochastic paths.

Consider the R×C detection area as previously described. And assume that we have the starting point and elapsed time joint pdf $f(\text{path}(Cs,T))$. If we could practically enumerate all paths then we could describe a path by listing the specific (row, column) pairs the pedestrian moves to as he progresses throughout time. Hence, {(R1, C1), (R2, C2), ... (Rt-1, Ct-1), (Rt, Ct)} uniquely and completely defines a path given the starting point, the ending point, and the overall time T. Note that the subscript notation for R and C has been modified to now represent time instead of row number.

Let W((Rt, Ct), (Rt+1, Ct+1)) be the set of voxels that path segment PathSegment((Rt, Ct), (Rt+1, Ct+1)) intersects when a pedestrian moves from row Rt, column Ct to row Rt+1, column Ct+1. Now let's walk a stochastic path starting in row 1 at time t=1 and see how the expected maximum pd develops for the unrestricted stochastic case.

Time 1: Since $f(\text{path}(Cs,T))$ is our partitioning event we know that our starting column in row 1 at time t=1 is column Cs. Note that pedestrian zone exit occurs in row R column Ce at some future time T.

Time 2: Once we pick our time position (R2, C2) conditioned on $f(\text{path}(Cs,T))$ we can determine W((R1, C1), (R2, C2)). From this, we can determine the expected maximum pd for sensor s along the path segment:

$$\text{MaxPathPd}\big((R1,C1),(R2,C2)|s\big) = \text{Max}\{pd(j,k|s)\}\text{voxels}(j,k)_\epsilon W\big((R1,C1),(R2,C2)\big)$$

From time step 3, the calculations become much more complex. At time t=3, we know that a pedestrian is in voxel (R3,C3) and we know the starting and ending points of the pedestrian's path. Since we cannot explicitly enumerate all possible paths using this formulation, then, we do not know the pedestrian's previous voxel location. (R2,C2) at time t=2. Now, define PTrip((R2,C2)|(R3,C3),Cs) as the probability that a pedestrian in row R3, column C3 at t=3 traveled from row R2, column C2 given the overall path starting and ending points.

Using a Markov transition matrix and time dependent position probabilities extracted using the initial position assumptions, we can completely describe all of the PTrip probabilities. Now we can calculate the expected maximum probability of detection for the pedestrian in a voxel at time t=3 by conditioning on the time t=2 the voxel values, determining the conditional maximums along the path segments, and weighting the conditional maximum pds by the PTrip((R2,C2)|(R3,C3),Cs,T) values. Note that we must also check if the current vowel values for MaxPathSegmentPd at time t=2 are the maximum pd values. This yields:

$$\text{MaxPathSegmentPd}\big((R2,C2),(R3,C3)|s\big) = \text{Max}[\text{MaxPathSegmentPd}\big((R1,C1),(R2,C2)|s\big), \text{Max}\{pd(j,k|s)\}]\text{voxels}(j,k)_\epsilon W\big((R1,C1),(R2,C2)\big);$$

and $$\text{ExpectedMaxPathSegmentPd}((R3,C3)|s,Cs,T)=$$
$$\Sigma \text{MaxPathSegmentPd}\big((R2,C2),(R3,C3)|s\big) *$$
$$P\text{trip}((R2,Cr2)|(R3,C3),Cs,T) \; \text{Voxels}(R2,C2)=\text{all voxels adjacent}(R3,C3)$$

All subsequent rows use a similar recursion using conditional expectations. For a general time t≥4, we get:

$$\text{ExpectedMaxPathSegmentPd}\big((Rt,Ct)|(Rt\text{-}1,Ct\text{-}1),s\big) =$$
$$\text{Max}[\text{ExpectedMaxPathSegmentPd}\big((Rt\text{-}1,Ct\text{-}1)|s,Cs,T\big), \text{Max}\{pd(j,k|s)\}]\text{voxels}(j,k)_\epsilon W\big((Rt\text{-}1,Ct\text{-}1),(Rt,Ct)\big);$$

and $$\text{ExpectedMaxPathSegmentPd}((Rt,Ct)|s,Cs,T)=$$
$$\Sigma \text{ExpectedMaxPathSegmentPd}\big((Rt,Ct),(Rt\text{-}1,Ct\text{-}1)|sz,22\big) * P\text{trip}((Rt\text{-}1,Ct\text{-}1)|(Rt,Ct),Cs,T)$$
$$\text{Voxels}(Rt\text{-}1,Ct\text{-}1)=\text{all voxels adjacent } (Rt,Ct)$$

Note that we are only concerned with the expected maximum probability or detection when a pedestrian exits the monitored detection zone. Because pedestrians can move in any direction, a pedestrian could leave the DVDZG at any time equal to or greater than R. Therefore, to calculate ExPdMax(s), we must now aggregate ExpectedMaxPathSegmentPd(R,Ce|s|Cs,T) over all finishing times T>=R and all starting points using $f(\text{path}(Cs,T))$. Overall system performance ExPdMaxFused is now obtained by fusing the sensor ExPdMax(s)'s using the selected fusion rule.

The foregoing description of the preferred embodiments of the invention has been presented for purposes of illustration and description only. It is not intended to be exhaustive or to limit the invention to the precise form disclosed; and obviously many modifications and variations are possible in light of the above teaching. Such modifications and variations that may be apparent to a person skilled in the art are intended to be included within the scope of this invention as defined by the accompanying claims.

What is claimed is:

1. A method for calculating an expected maximum probability of detection of targets for a sensor grid within a detection zone for optimizing said sensor grid, comprising:
providing a plurality of sensors in said sensor grid that produce sensor data for detection of said targets;
partitioning said detection zone into a plurality of discrete voxels that form a discrete voxel detection zone grid comprising rows and columns wherein each discrete voxel comprises a discrete three-dimensional space;
removing non-spatial variables from said sensor data of said plurality of sensors of said sensor grid to provide a sensor performance of said plurality of sensors as a function of spatial variables;
mapping said sensor performance of said plurality of sensors into coordinates consistent with said discrete voxel detection zone grid;
configuring a computer to provide selection options for selecting a discrete target flow model to represent target movement within said discrete voxel detection zone grid wherein said discrete target flow model comprises either a restricted stochastic movement model or an unrestricted stochastic movement model, said restricted stochastic movement model requiring forward movement of said targets from row to subsequent row from an entry point on a first row toward an exit point on a last row, said unrestricted stochastic movement model allowing forward and reverse movement of said targets between rows from said entry point to said exit point;
configuring said computer for determining said expected maximum probability of detection of said targets for said sensor grid within said detection zone; and
utilizing said expected maximum probability of detection for optimizing said sensor grid.

2. The method of claim 1, wherein said plurality of discrete voxels comprise a uniform size and shape.

3. The method of claim 1, wherein selection of said restricted stochastic model comprises utilizing an ExPdMax(s) technique adapted for said restricted stochastic model to reduce a number of required calculations from order $C^R$ to order $RC^2$
where:
ExPdMax(s) represents an expected maximum probability of detection for each sensor,
s represents each sensor,
C represents said columns, and
R represents said rows.

4. The method of claim 3 wherein said expected maximum probability for detection for path segments from row 1 to row 3, given Cr3, is as follows:

ExpectedMaxPathSegmentPd(R3,Cr3|s,Cs,Ce) = ΣMaxPathSegmentPd(R3,Cr3|s,Cs,Ce) * Ptrip(R2,Cr2|Cr3,Cs,Ce) Cr2=1, . . . C where:
ExpectedMaxPathSegmentPd(R3,Cr3|s,Cs,Ce) is said ExPdMax(s) for said target movement for segments of paths from rows 1 to row 3;

R3 represents row three,
Cr3 represents the column of a target in row 3,
Cr2 represents the column of said target in row 2,
Cs represents a starting column,
Ce represents an ending column,
PTrip(Rk,Cm|Cn,Cs,Ce) is the probability that a target known to be in column Cn in row Rk+1 traveled from column Cm in row Rk given the overall path starting and ending points, where n, m, and k are column and row numbers respectively.

5. The method of claim 4 wherein said expected maximum probability for detection for path segments from rows greater than or equal to row four, is as follows:

ExpectedMaxPathSegmentPd(Rq,Crq|Crq−1,s) =Max [ExpectedMaxPathSegmentPd(Rq−1,Crq−1|s,Cs, Ce),Max{pd(j,k|s))}]voxels(j,k)∈W(Crq−1,Crq, Rq−1)

ExpectedMaxPathSegmentPd(Rq,Crq|s,Cs,Ce)= ΣExpectedMaxPathSegmentPd(Rq,Crq|Crq−1,s) * Ptrip(Rq−1,Crq−1|Crq,Cs,Ce) Crq−1= 1, . . . C where
ExpectedMaxPathSegmentPd(Rq,Crq|s,Cs,Ce) is ExPdMax(s) for said target movement for segments of paths from row four to a final row,
Rq is for rows greater than or equal to row four, and
Crq represents the column of said target in Rq.

6. The method of claim 3, wherein said expected maximum probability of detection of said targets for said sensor grid within said detection zone is determined by fusing ExPdMax(s) for each sensor s.

7. The method of claim 1, wherein selection of said unrestricted stochastic model comprises utilizing an ExPdMax(s) technique adapted for said unrestricted stochastic model to account for all possible unrestricted stochastic paths through said detection zone
where:
ExPdMax(s) represents said expected maximum probability of detection for each sensor, and s represents each sensor.

8. The method of claim 7 wherein said expected maximum probability for detection for path segments from row 1 to row 3, given Cr3, is as follows:

ExpectedMaxPathSegmentPd((R3,C3)|s,Cs,T)= ΣMaxPathSegmentPd( (R2,C2),(R3,C3)|s) * Ptrip((R2,Cr2)|(R3,C3),Cs,T)

where:
ExpectedMaxPathSegmentPd(R3,Cr3,Cs,T) is said ExPdMax(s) for said target movement for segments of paths from rows 1 to row 3,
R3 represents row three,
Cr3 represents the column of the target in row 3,
Cs represents a starting column,
Ce represents an ending column,
(R2,C2)=all voxels adjacent (R3,C3), and
PTrip((R2,C2)|(R3,C3),Cs,T) is the probability that said target in row R3, column C3 at t=3 traveled from row R2, column C2 given an overall path starting and ending point.

9. The method of claim 8 wherein said expected maximum probability for detection for path segments from rows greater than or equal to row four, is as follows:

ExpectedMaxPathSegmentPd((Rt,Ct)|s,Cs,T)= ΣExpMaxPathSegmentPd( (Rt,Ct),(Rt−1,Ct− 1)|s) * Ptrip((Rt−1,Ct−1)|(Rt,Ct),Cs,T)

where
- ExpectedMaxPathSegmentPd((Rt,Ct)|s,Cs,T) is said ExPdMax(s) for said target movement for segments of paths from row four to a final row,
- Rt is for rows with a general t≥4,
- Ct is for corresponding columns of Rt,
- Rt−1,Ct−1=all voxels adjacent (Rt,Ct).

10. The method of claim 7, wherein said expected maximum probability of detection of said targets for said sensor grid within said detection zone is determined by fusing ExPdMax(s) for each sensors.

\* \* \* \* \*